United States Patent [19]

Graux et al.

[11] Patent Number: 5,932,001
[45] Date of Patent: Aug. 3, 1999

[54] PLASTER COMPOSITION CONTAINING AN AMYLACEOUS COMPOUND

[75] Inventors: Jean-Pierre Graux, Lillers; Clément Robert, Sailly-Sur-La-Lys, both of France

[73] Assignee: Roquette Freres, France

[21] Appl. No.: 08/853,569

[22] Filed: May 9, 1997

[30] Foreign Application Priority Data

May 15, 1996 [FR] France ................................ 96 06107

[51] Int. Cl.⁶ ............................ C04B 24/12; C04B 24/10
[52] U.S. Cl. .................. 106/779; 106/804; 106/217.01
[58] Field of Search ................................ 106/779, 804, 106/217.1

[56] References Cited

U.S. PATENT DOCUMENTS 4,604,142  8/1986  Kamohara et al. ................. 106/779

FOREIGN PATENT DOCUMENTS

| 520249 | 1/1956 | Canada ................................ 106/779 |
| 0 117 431 | 9/1984 | European Pat. Off. . |
| 0 131 090 | 1/1985 | European Pat. Off. . |
| 0 139 597 | 5/1985 | European Pat. Off. . |
| 0 172 773 | 2/1986 | European Pat. Off. . |
| 0 232 202 | 8/1987 | European Pat. Off. . |
| 0 282 415 | 9/1988 | European Pat. Off. . |
| 0 333 292 | 9/1989 | European Pat. Off. . |
| 0 406 837 | 1/1991 | European Pat. Off. . |
| 0 562 927 | 9/1993 | European Pat. Off. . |
| 0 603 727 | 6/1994 | European Pat. Off. . |
| 1 429 406 | 5/1966 | France . |
| 2 434 821 | 3/1980 | France . |
| 2 477 159 | 9/1981 | France . |
| 32 03 067 | 8/1982 | Germany . |

OTHER PUBLICATIONS

Starch Starke, vol. 45, No. 6 (Jun. 1, 1993) pp. 226–231.
Chemical Abstracts, vol. 104, No. 20 (May 19, 1986).
"Catalogue of test methods for plasters" Syndicat National des Industries du Plâtre, (Apr. 1983) chapter 3, p. 5—point 3.12.

*Primary Examiner*—David Brunsman
*Attorney, Agent, or Firm*—Henderson & Sturm

[57] ABSTRACT

The present invention relates to a new plaster, coating or adhesive composition based on plaster, containing an amylaceous compound. The amylaceous compound used according to the invention consists of a cationic amylaceous compound having, characteristically, a fixed nitrogen content at least equal to about 0.15% and a solubility in water at least equal to about 50%.

14 Claims, No Drawings

PLASTER COMPOSITION CONTAINING AN AMYLACEOUS COMPOUND

The present invention relates to a new plaster composition containing an amylaceous compound.

The term "plaster" means, in particular, all building plasters, plasters for special building purposes, plasters for prefabrication and moulding plasters for the arts and industry.

This definition includes, in particular:

manual plasters of all kinds, compositions, properties and particle sizes, plasters for coatings, surfacing plasters (including finishing by smoothing or application in a thin film), projection plasters, plasters for smooth supports, plasters for floor finishing, plasters for facing with imitation brickwork, plasters for exterior coatings, whereby all said plasters may be of all kinds, compositions, properties and particle sizes.

This definition also applies to any composition containing a plaster as a significant or majority component, and hence in particular to all coatings or adhesives based on plaster for interior or exterior work.

The plaster compositions according to the invention must be considered both in the form of powders, these being ready to use or otherwise, and in the form of, for example, more or less homogeneous mixtures of plaster/water, more or less fluid pastes, hardened pastes or finished articles of all forms, properties (including mechanical properties, density and porosity) and intended uses.

The plaster compositions according to the invention may consist, in particular, of plaster compositions (ready to use powders or otherwise, mixes, or plaster mortars, etc., . . . ) for manual use or for use by mechanical projection.

The origin, nature and concentration of any form of calcium sulphate contained in the plaster (dihydrate form= gypsum, hydrated forms, particularly hemihydrates, calcined/rehydrated forms, anhydrous forms, . . . ) are in no way limiting within the context of the present invention. The plaster present in the plaster composition according to the invention may, for example, contain about 50% to 100% by weight of hemihydrate form(s) of calcium sulphate.

The use of amylaceous compounds and other polysaccharides in the field of plasters and coatings based on hydraulic binders is widely disclosed in the literature.

For example, the French patent FR 1 429 406 and European patent EP 172 773 describe the use of native of chemically modified amylaceous compounds, for the preparation of plaster bord or plaster tiles with a cardboard coating.

In these documents, the amylaceous compounds are granular products, possibly fluidized, which ensure a good bonding between the cardboard and the plaster after a high temperature of about 180–190° C. heat treatment.

For the preparation of these articles, it is compulsory that the amylaceous compounds have no detrimental influence on the fluidity, the hardening or the setting of the plaster body. These amylaceous compounds first must have no thickening effect so that the plaster composition present a sufficient fluidity to spread uniformly on the cardboard coating.

Other documents describe the use of amylaceous compounds in the plaster field but with different purposes than the purpose of ensuring a sticking effect between cardboard and tile which is sought for the plaster tiles.

For example, the German patent DE 32 03 067 describes the use, as dispersing agents for plaster, of combinations based on two different polysaccharide derivatives. The first is generally a derivative of cellulose of the "CMC" type, the second may consist of a starch derivative, particularly an anionic amylaceous compound of the phosphated or oxidised starch type.

European patent EP 117 431 underlines the advantage, as water retaining agents for plaster-based mixtures, of combinations of particular cellulosic compounds, namely nonionic cellulose ethers and particular amylaceous compounds, namely pregelatinised hydroxyalkyl, particularly hydroxyethyl or hydroxypropyl starches.

European patent application EP 131 090, in turn, advocates the use, as water retaining agents of adhesives or hydraulic binders, of polysaccharides modified by special polymers, namely a) crosslinked, b) swelling/water-insoluble and c) non-flocculating polymers.

It appears that such additives may consist advantageously of (hydroxy)alkyl derivatives of cellulose modified by a crosslinked polyacrylamide.

From another angle, if consideration is given to amylaceous compounds effectively used in industry in plaster compositions, it appears that the compounds concerned are almost exclusively hydroxyalkyl and/or carboxyalkyl amylaceous compounds, particularly hydroxypropyl and carboxymethyl potato starches.

When used as thickeners, however, such compounds have certain disadvantages.

Carboxyalkyl amylaceous compounds are alkaline products and are thus sensitive to the problem of storage, including storage in aerated plasters. The carbonation of such amylaceous compounds manifests itself, inter alia, by reduced solubility and effectiveness. Independently, this effectiveness (thickening capacity) is generally reduced in the case of plaster compositions with a pH of more than about 10.5.

Moreover, the preparation of carboxyalkyl amylaceous compounds, particularly with moderate or high degrees of substitution (DS), requires the use of unwieldy and costly processes and equipment.

Hydroxyalkyl amylaceous compounds, in turn, are used in industrial practice mainly in plaster compositions with a pH of more than about 11.

The preparation of such amylaceous compounds is both difficult (use of alkylene oxides) and costly.

The fact that carboxyalkyl and hydroxyalkyl amylaceous compounds are truly effective in different pH ranges gives rise, for producers of plaster compositions, to the need to obtain supplies of both these categories of amylaceous compounds in order to cover the requirements of their own customers as best they can.

Moreover, it seems that none of these categories completely meets the current demands of the art as regards plasters with a pH that lies in a range that can be termed "intermediate", namely with a pH of between about 10.5 and 11.

This observation has, inter alia, led certain producers of amylaceous compounds to advocate the use, under certain circumstances, of products that are simultaneously carboxyalkyl and hydroxyalkyl products.

Such "disubstituted" products combine, however, the disadvantageous in terms of ease/cost of obtaining them, of each of the two categories of "monosubstituted" amylaceous compounds mentioned above.

It follows from the above discussion that there was a need to find, as an additive for plaster compositions, an amylaceous compound which, at the same time:

is applicable to plaster compositions of various kinds, compositions and intended uses, can be used in plaster compositions having various pH values, including those lying within the "intermediate" range of about 10.5–11 mentioned above, is derived from a simple, flexible and inexpensive production process, has an effectiveness that does not deteriorate substantially during storage.

The Applicants, to their credit, have found that such an amylaceous compound could consist of an amylaceous compound of a cationic nature having particular characteristics in terms a) of fixed nitrogen content and b) solubility in water.

The use of cationic amylaceous compounds in plaster compositions is not new in itself since it has been described in French patent FR 2,434,821 granted in the Applicants' name. Example VI of said patent thus describes the use, in projection plaster compositions, of particular cationic amylaceous compounds, namely cationic potato starches having a high fixed nitrogen content (about 2%) and a high viscosity.

Such cationic starches are presented as good thickening/water retaining additives when they are introduced in a quantity of at least 0.5 wt. % of the plaster compositions studied.

However, to the Applicants' knowledge, such cationic amylaceous compounds have never been really exploited industrially and commercially in plasters, whether in projection plasters of the type described in patent FR 2,434,821 mentioned above, or in any other plaster, coating or adhesive composition based on plaster.

In the main, as will be explained elsewhere, it appears that cationic amylaceous compounds such as those described in patent FR 2,434,821, have only a limited thickening capacity and, in any case, are unable to meet the current demands of the art.

This also explains why the man skilled in the art has hitherto given preference to the use, in plasters, of the hydroxyalkyl and/or carboxyalkyl amylaceous compounds mentioned above.

Following extensive research, the Applicants have now shown that cationic amylaceous compounds were perfectly suitable in this type of application if said compounds were bestowed with two essential properties, namely:

a fixed nitrogen content of at least about 0.15%, and a solubility in water of at least about 50%.

The term "fixed nitrogen content" means the weight of tertiary or quaternary nitrogen contained in a given cationic amylaceous compound, the dry weight of the latter being taken as a basis.

Thus, a fixed nitrogen content of 0.50% indicates that 100 g of dry matter of product contain 0.5 g of nitrogen.

The "solubility in water" is determined, at ambient temperature (20° C.), according to the following protocol:

200 ml of distilled water at 20° C. are introduced into a 50 ml beaker fitted with a magnetic stirrer. 5 g of amylaceous compound are added, with stirring, and the mixture is left for 15 minutes, with stirring. The homogenised mixture obtained is then centrifuged for 10 minutes at 4,000 rpm and at ambient temperature.

25 ml of supernatant liquid are then removed and introduced into a tared vessel (glass crystallising dish with a diameter of 95 mm, dried beforehand in an oven).

The dish plus contents are placed in a ventilated oven at 60° C. until the water evaporates, then for 1 hour in a controlled air circulation oven at 103±2° C.

The vessel is then introduced into a drier to be cooled to ambient temperature, and then reweighed.

The solubility in water ("SW"), expressed as a percentage by mass of initial product, is given by the formula below:

$$\text{``}SW\text{''} = ((M \times 200)/(25 \times P)) \times 100$$

where

M=mass of the residue, in g

P=mass of the test sample, in g.

The cationic amylaceous compounds described in French patent FR 2.434.821 mentioned above have a solubility in water substantially lower than 50%, being generally between about 10 and 30%.

Very surprisingly, although these cationic amylaceous compounds according to the prior art have a very high aqueous viscosity, they prove to be much less effective thickeners of plaster compositions than those used in conformity with the present invention yet which have an appreciably lower viscosity.

The Applicants have also found, as mentioned above, that the cationic amylaceous compounds used according to the invention had to have a fixed nitrogen content of at least about 0.15% in order to be truly effective.

Surprisingly, and as will be explained elsewhere, it was ascertained that a cationic amylaceous compound having a fixed nitrogen content lower than this limit (for example, 0.12%) did not prove to be a very effective thickener:

even though it has a very high solubility in water (95%), even if it was used at rates of introduction significantly higher than a cationic amylaceous compound used in conformity with the present invention and having, for example, a fixed nitrogen content of about 0.3%.

It follows from the above that the present invention relates to a plaster composition containing a cationic amylaceous compound, characterised in that said cationic amylaceous compound has a fixed nitrogen content of at least about 0.15% and a solubility in water of at least about 50%.

Advantageously, said cationic amylaceous compound has a solubility in water of 70 to 100%, preferably 75 to 99.8%.

According to another variant of the invention, said cationic amylaceous compound has a fixed nitrogen content of 0.16 to 2%, preferably 0.2 to 1.85%. Applicants have found that cationic amylaceous compounds having a fixed nitrogen content of 0.25 to about 1.5% were particularly suitable for the present invention.

Finally, according to a third variant, said cationic amylaceous compound represents less than 0.5%, particularly about 0.01 to about 0.2%, expressed by weight with respect to the weight of plaster contained in said composition.

The term "amylaceous compound" within the meaning of the present invention means all starches of natural or hybrid origin, including those derived from genetic mutations or manipulations. Said starches may, in particular, be derived from potato, potato with a high amylopectin content (waxy potato), corn, wheat, corn with a high amylopectin content (waxy corn), corn with a high amylose content, rice, peas, or manioc, cuts or fractions which may be made or obtained therefrom such as amylose, amylopectin, granulometric fractions known to the expert in the field under the names wheat starch "A" and wheat starch "B", and any mixtures of at least any two of the above-mentioned products, for example, a mixture of at least one tuber starch (particularly potato starch) and at least one cereal starch (wheat starch "A", wheat "B", corn, particularly waxy corn). The amylaceous compounds which can be used according to the invention may also consist of flours or other mixtures containing starch(es) and vegetable protein(s), the "starch" component being in the majority.

The term amylaceous compound may also refer to starch derivatives which, as will be described elsewhere, may undergo at least one additional treatment before, at the same time as or after the cationisation stage required to obtain a cationic amylaceous compound.

Said cationisation stage of the amylaceous compound may be carried out in an aqueous medium, in a solvent medium or in a dry phase, in such a way as to allow one or more nitrogen groups of an electropositive nature to be fixed on the amylaceous compound.

Said nitrogen groups may contain, in particular, a tertiary or quaternary nitrogen atom such as the reagents described in patents FR 2,434,821, EP 139,597 and EP 282,415, filed in the name of the Applicants.

The cationic amylaceous compounds used in the plaster composition according to the invention may be prepared, in particular, by any of the cationisation methods, particularly cationisation in the dry phase, described in patents FR 2,434,821, FR 2,477,159, EP 333,292, EP 406,837, U.S. Pat. No. 4,332,935 and U.S. Pat. No. 4,492,536. They may, moreover, be of a "polycationic" nature such as those described in patents EP 406,873 and U.S. Pat. No. 4,492,536. They may consist of mixtures having cationic potato starch/cationic corn or wheat starch weight ratios from about 10/90 to about 90/10, and in particular from 20/80 to 80/20, it being understood that cationisation may have been carried out, as described in patent EP 139,597 in the Applicants' name, on a mixture of two starches or on each of the two starches separately, which are then mixed.

As indicated above, the amylaceous compound used according to the invention may, before, at the same time as or after the cationisation stage, undergo at least one chemical treatment and/or at least one physical treatment.

The chemical treatment may consist, in particular, of one or other of the known methods of cross-linking, oxidation, alkaline treatment, fluidification or hydrolysis by acids and/or enzymes, etherification, esterification, sulphonation or plasticising.

For example, the Applicants have found that in addition to cationic starches, i.e. starches not treated before, during or after cationisation, amylaceous compounds that are particularly useful within the context of the invention could consist of cationic starches treated (before, during and/or after cationisation) by a method of cross-linking, oxidation or acid and/or enzymatic fluidification.

The term crosslinking method means, in particular, any process in which a starch (or cationic starch) is caused to react with an agent such as adipic acid or one of its derivatives, a halohydrin (for example, epichlorohydrin), a trimetaphosphate (for example, sodium), phosphorus oxychloride or a resin (for example, based on formaldehyde).

Such crosslinked cationic starches are described, in particular, in European patent EP 603.727.

The term oxidation method means, in particular, any non-degrading oxidation method that allows at least one OH group of the starch (or cationic starch) to be substituted by a COOH group.

Such methods are described, in particular, in European patents EP 232,202 and 562,927.

The methods of fluidification or hydrolysis of starches and derivatives by acids and/or enzymes are widely known by the expert in the field.

In the present case, the fluidized cationic starches will preferably be hydrolysates of cationic starches having a dextrose equivalent (DE) of less than about 5.

Consequently, the plaster composition according to the invention may also be characterised in that the cationic amylaceous compound which it contains is chosen from cationic starches, crosslinked cationic starches, oxidised cationic starches and cationic starches which have been fluidized or hydrolysed by acids and/or enzymes consisting preferably of cationic starch hydrolysates with a DE of less than 5.

As indicated above, it is also possible, in conformity with the invention, to use other cationic amylaceous compounds such as cationic starches treated (before, during and/or after cationisation) by methods of etherification, esterification or plasticising such as, for example, cationic hydroxyalkyl starches, cationic acetyl, propionyl or succinyl starches, cationic starches plasticised by polyols (sorbitol, maltitol, lactitol, glycerol, . . . ), lactates and/or or urea.

Some of these methods make it possible to obtain amphoteric starches, i.e. amylaceous compounds that are both cationic and anionic.

As mentioned above, the amylaceous compound used according to the invention may, before, at the same time as or after the cationisation stage, undergo a physical treatment or several physical treatments, which may or may not be performed simultaneously.

These physical treatments may, in particular, be chosen from heat treatments, mechanical treatments, (very) high pressure treatments, ultrasonic treatments, microwave treatments or treatments under vacuum.

Such treatments may consist, in particular, of cooking-extrusion, continuous steam cooking, drum gelatinisation, atomisation, fluidification or mechanical shearing or grinding.

Such physical treatments may, as mentioned already, readily be a) combined with the above-mentioned chemical treatments or b) performed at the same time as cationisation ("in situ" cationisation of the amylaceous compound during the cooking thereof, for example).

Consequently, the plaster composition according to the invention may, advantageously, be characterised in that the cationic amylaceous compound which it contains is chosen from cationic amylaceous compounds that have been treated by heat, mechanically, at (very) high pressures, with ultrasonics, with microwaves and/or under vacuum, in particular chosen from cationic amylaceous compounds that have been extruded, continuously steam-cooked, gelatinised in a drum, atomised, fluidized, or sheared mechanically and/or ground.

Such treatments make it possible, inter alia:
  to increase the solubility in water of cationic amylaceous compounds that can already be used according to the invention, or
  to render the solubility in water of amylaceous compounds compatible with that provided for in conformity with the invention, namely at least equal to 50%, preferably at least equal to 70%.

The grinding treatments, if used, make it possible, as the expert in the field knows, to adapt the granulometry of the amylaceous compound to that of the plaster and, for example, to obtain an amylaceous compound in which at least 95% of the particles are less than 200 $\mu$m or microns in size.

Moreover, the Applicants have also observed that the cationic amylaceous compounds (starches, chemically and/or physically modified starches) that can be used in the plaster compositions according to the invention could also be derived advantageously from cereals or tubers having, naturally or otherwise, for example, due to mutation or genetic manipulation, an amylopectin content of at least about 80%, particularly derived from waxy corn or waxy potato.

By way of information, such cationic amylaceous compounds derived from waxy corn or potato may have, in particular:

a fixed nitrogen content of about 0.25 to 1.50%, and
a solubility in water of about 75 to 99.8%.

According to one variant of the present invention, the plaster composition according to the invention is therefore characterised in that the cationic amylaceous compound which it contains is chosen from the cationic amylaceous compounds derived from cereals or tubers having, naturally or otherwise, an amylopectin content of at least 80%, preferably derived from waxy corn or waxy potato.

As mentioned previously, the cationic amylaceous compounds that can be used according to the invention surprisingly have a viscosity that is (very much) lower than that of the products described in patent FR 2 434 821 whereas they prove to be significantly more effective thickeners than the latter. In preference, within the context of the present invention, the cationic amylaceous compounds have a viscosity between about 20 and about 5000 mPa.s, preferably from 50 to 3000 mPa.s, said viscosity being measured at a concentration of 10%. At such a concentration of 10%, cationic potato starches such as those described in patent FR 2 434 821 have substantially higher viscosities, for example, of the order of 20,000 to 40,000 mPa.s.

As indicated before, the terms "plaster" and "plaster compositions" within the meaning of the present invention are in no way limiting.

Apart from the plaster and the cationic amylaceous compound, the composition according to the invention may also contain, in very variable compositions, at least one additive included in the non-limiting list comprising:

accelerators such as, for example, gypsum, potassium sulphate, lime, . . . , retarders such as, for example, protein compounds and derivatives of animal or vegetable origin (gelatine, keratin, protein hydrolysates such as hydrolysed wheat gluten or the product known as "RETARDAN® P" marketed by Chemische Fabrik Grünau GmbH, . . . ), organic acids, salts and derivatives thereof (gluconates, citric or tartaric acids, . . . ), fillers such as, for example, mineral fibres (rock fibres, glass fibres, siliceous, aluminosilicate, aluminous or calcium silicate fibres), kaolin, alumina, bauxite, sand, mica, perlite, vermiculite, . . .

water retaining agents such as, for example, celluloses and cellulose derivatives (carboxymethyl cellulose), methyl cellulose hydroxymethyl cellulose, . . . ), non-cationic amylaceous compounds, alginates, gums (xanthan gum, wellan gum, . . . ), water-repelling agents such as, for example, silicone oils and derived products, magnesium stearate, . . . , lightweight additives, additives for thermal and/or acoustic insulation of the finished articles based on plaster such as, for example, polystyrene beads, plastic beads, glass beads, glass fibres, waste paper fibres, perlites, crushed plastic waste, . . .

anti-foaming agents, fungicides, bactericides, colouring agents, bonding agents (PVA, PVAC, versatate, . . . ).

As indicated above, the plaster composition according to the invention may be in the form of a powder (ready to use or otherwise), a plaster/water mixture (homogeneous or otherwise), a more or less fluid paste, a hardened paste and, finally, a finished article intended, inter alia, for the building industries and public works.

The present invention therefore relates, inter alia, to plaster powders, plaster-based coating or adhesive powders, ready to use, and to the material compositions (mixtures, pastes, finished articles) obtained at any time from such powders, particularly concerned, during and/or after known operations involving mixing, blending, daubing, projection, hardening, dressing, floating, smoothing, spreading, moulding/mould release, drying and forming.

Preferably, plaster compositions according to the invention are those which do not necessitate any high temperature heat treatment after or during the above-mentioned operations.

Such plaster compositions may consist, in particular, of plaster compositions for manual use or use by mechanical projection.

It should be emphasised that within the context of the process for the preparation of the plaster composition according to the invention, the use and the bringing into contact with one another of the cationic amylaceous compound, the plaster and any additives may be carried out by a large number of different ways, particularly as regards the form of introduction (liquid, viscous or solid form, introduction by intimate mixing or by spraying, . . . ) and the time of introduction (introduction from the outset or staggered over time) of each of these constituents into said composition.

For example, the cationic amylaceous compound may be in the form of a powder which is mixed with a ready to use plaster composition which is also in the form of a powder.

According to another variant, an amylaceous compound powder is first pre-mixed with all or part of any powder additives that have to be contained in the plaster composition according to the invention, then the mixture of powders thus obtained, which may be termed "additive composition for plaster" is brought into contact with the plaster as such, to which plaster additives may or may not have been added beforehand.

The cationic amylaceous compound used in conformity with the invention and of which the solubility in water is, as was underlined, one of the essential features of the invention, may also be brought into contact with the plaster during the mixing operation by way of the mixing water, to which water additives may or may not have been added beforehand.

Consequently, the present invention also relates to the use of a cationic amylaceous compound having a fixed nitrogen content of at least about 0.15% and a solubility in water of at least about 50% for the preparation of plaster compositions, particularly plasters for manual use or use by mechanical projection, or for the preparation of additive compositions or of mixing water intended for said compositions.

In a preferential manner, said cationic amylaceous compound has:

a fixed nitrogen content of 0.20 to 1.85% and
a solubility in water of 75 to 99.8%.

Advantageously, the quantity of cationic amylaceous compound used is such that the plaster composition, the additive composition or the mixing water contains less than 0.5%, particularly about 0.01 to about 0.2% by weight of said amylaceous compound, expressed with respect to the weight of plaster already contained in said composition or having to be contained therein after it has been brought into contact with said additive composition or said mixing water.

The invention may also be better understood with the aid of the examples that follow and which describe certain particularly advantageous modes of the cationic amylaceous compounds and plaster compositions that may be obtained and used in conformity with the invention.

EXAMPLE 1

Use of Cationic Amylaceous Compounds According to the Invention or Otherwise, in Manual Plaster Compositions Within the context of this example, the thickening function of cationic amylaceous compounds according to the invention is compared with that of cationic amylaceous compounds used according to the prior art, in manual plaster compositions.

The plaster used within the context of these tests is in the form of a powder composed of 75 wt. % of calcium sulphate hemihydrate and 25 wt. % of anhydrous calcium sulphate of the "dead-burned" type.

To this plaster is added:
- a) 0.04 wt. % of a cationic amylaceous compound which may or may not comply with the invention,
- b) 0.05 wt. % of the retarder known to the expert in the field under the name of "RETARDAN® P" (calcium salt of polyoxymethyl amino acids), which product is able to retard the setting of the plaster and hence to allow a better estimate of the effectiveness of the amylaceous compound introduced therein.

The pH of the plaster composition thus obtained is about 10. A "reference" plaster composition is obtained in the same way except that no amylaceous compound is introduced therein.

By sprinkling, each of the plasters is mixed with an equal weight of water with the result that the plaster compositions studied have a water/plaster or W/P ratio of 1.

The thickening nature of the cationic amylaceous compounds according to the invention or otherwise is determined in the conventional way in conformity with the "Spread Method" described in chapter 3, page 5—point 3.12 of "CATALOGUE OF TEST METHODS FOR PLASTERS" published in April 1983 in the name of SYNDICAT NATIONAL DES INDUSTRIES DU PLATRE.

The mixing time is 3 minutes, after which the plaster compositions obtained, which are then in the form of pastes, are introduced into a cylindrical brass mould (height: 50 mm, internal diameter: 60 mm) of the "SMIDTH ring" type placed on a flat, smooth and clean glass plate. The surface of the paste is struck off to the upper level of said ring, then at a time corresponding to 4 minutes after the beginning of mixing, said ring is lifted away vertically. The diameter of the blank thus formed is then measured in two perpendicular directions.

For each composition tested ("reference" composition without amylaceous compound, compositions with cationic amylaceous compound according to the invention or otherwise), the spread value is expressed in mm, taking account of the arithmetic mean of the measurements taken on said composition.

It is understood that the lower the spread value of a plaster composition, the more the amylaceous compound it contains can be regarded as an effective thickener.

Within the context of these tests, the thickening nature of the cationic amylaceous compounds T1 to T3 below, not complying with the invention, was studied:
- T1—cationic corn starch (fixed nitrogen content about 0.12%), fluidized by acid hydrolysis then extruded, having a solubility in water of about 95%.
- T2=cationic potato starch (fixed nitrogen about 1.1%) having a solubility in water of about 30%.
- T3=cationic potato starch (fixed nitrogen about 1.8%) having a solubility in water of about 10%.

The plaster compositions containing, respectively, the cationic amylaceous compounds T1 to T3 are referred to hereinafter as COMPOSITIONS T1 to T3 respectively.

The "reference" plaster composition, in turn, which contains no amylaceous compound, is referred to hereinafter as COMPOSITION T0.

Within the context of these same tests, the thickening nature of the cationic amylaceous compounds A to H below according to the invention is studied:
- A=cationic potato starch (fixed nitrogen about 0.3%), extruded and ground, having a solubility in water of about 84%.
- B=cationic waxy corn starch (fixed nitrogen about 0.3%), gelatinised in a drying drum, having a solubility in water of about 88%.
- C=idem cationic amylaceous compound B but ground to at least 200 μm and having a solubility in water of about 91%.
- D=cationic waxy corn starch (fixed nitrogen about 0.3%), extruded and having a solubility in water of about 93%.
- E=cationic corn starch (fixed nitrogen about 1%), extruded and having a solubility in water of about 60%.
- F=cationic potato starch (fixed nitrogen about 1.1%), extruded and having a solubility in water of about 96%.
- G=cationic potato starch (fixed nitrogen 1.8%), extruded and having a solubility in water of about 92%.
- H=cationic potato starch (fixed nitrogen about 0.6%), crosslinked with sodium trimetaphosphate, extruded and having a solubility in water of about 90%.

The plaster compositions according to the invention containing, respectively, the cationic amylaceous compounds A to H are known hereinafter as COMPOSITIONS A to H respectively.

The results below show, for each of the COMPOSITIONS T1 to T3 (not in accordance with the invention) and A to H (according to the invention), the difference between the spread value obtained for said COMPOSITION and that observed for COMPOSITION T0 which contains no amylaceous compound. This difference is marked below by the symbol "delta SV".

It is clear that when a thickener of any kind is incorporated in a plaster composition, the spread value of said composition falls. Consequently, a thickened plaster composition always has a negative "delta SV", the value of which (expressed in mm) increases as a function of the effectiveness of the thickener introduced.

| COMPOSITION | DELTA SV (in mm) |
| --- | --- |
| T0 | 0 |
| T1 | −20 |
| T2 | −10 |
| T3 | −10 |
| A | −110 |
| B | −130 |
| C | −136 |
| D | −100 |
| E | −85 |
| F | −75 |
| G | −95 |
| H | −55 |

Moreover, within the context of the same tests, a study was carried out on the thickening nature of the cationic amylaceous compounds T1 to T3 that do not conform with the invention, but with higher rates of introduction than that provided for initially (0.04%/weight of plaster).

The COMPOSITIONS T1b, T2b, T2c, T3b and T3c below were thus tested.

COMPOSITION T1b=idem COMPOSITION T1 but with a rate of introduction of cationic amylaceous compound T1 multiplied by 10, i.e. 0.4%/plaster.

COMPOSITION T2b=idem COMPOSITION T2 but with a rate of introduction of cationic amylaceous compound T2 multiplied by 6, i.e. 0.24%/plaster.

COMPOSITION T2c=idem COMPOSITION T2 but with a rate of introduction of cationic amylaceous compound T2 multiplied by 25, i.e. 1%/plaster.

COMPOSITION T3b=idem COMPOSITION T3 but with 0.24%/cationic amylaceous plaster compound T3.

COMPOSITION T3c=idem COMPOSITION T3 but with 1%/cationic amylaceous plaster compound T3.

The following results for "delta SV" are obtained by taking account of the spread value obtained without any amylaceous compound at all (reference COMPOSITION T0):

| COMPOSITION | DELTA SV (in mm) |
|---|---|
| T0 | 0 |
| T1b | −50 |
| T2b | −20 |
| T2c | −40 |
| T3b | −15 |
| T3c | −40 |

The overall outcome of the results of this EXAMPLE 1 is that the cationic amylaceous compounds specifically selected within the context of the invention prove to be much more effective thickeners of manual plasters that those used in conformity with patent FR 2.434.821 and, in a more general manner, than cationic amylaceous compounds not simultaneously having the two obligatory properties mentioned above, namely:

a fixed nitrogen content of at least 0.15%, and a solubility in water of at least 50%.

It will be noted that the cationic amylaceous compound T1, although it has a high solubility in water (about 95%), does not have a sufficient fixed nitrogen content for it to be regarded as a very effective thickener. This is particularly surprising in that it appears that even by increasing significantly (by a factor of 10) the rate of introduction of said compound T1 (cf COMPOSITION T1b), this compound does not make it possible to reach an effectiveness comparable with that obtained with one or other of the cationic amylaceous compounds that can be used according to the invention. This is true, for example, with regard to compounds A to C, which nevertheless have a) a relatively low fixed nitrogen content (0.3%) and b) a solubility in water lower than said compound T1.

The results of the present EXAMPLE 1 show, inter alia, the very good effectiveness of cationic amylaceous compounds in accordance with the invention having a high amylopectin content such as those derived from waxy corn (cf compounds B to D).

It should also be pointed out that additional tests showed that, respectively:

compound A, the use of which is in accordance with the invention, could also be effectively used in the above-mentioned plaster composition a) by prior processing and dissolution in the mixing water intended for the preparation of said composition or b) by use in the form of an amylaceous glue introduced, simultaneously or otherwise, into the water which is still possibly required for this preparation, variant a) being, in industrial practice, preferred to variant b).

compound C, the use of which is in accordance with the present invention, could also be used effectively in the above-mentioned plaster composition by way of an additive composition taking the form of a powder and including "RETARDAN® P".

The result is, therefore, as mentioned above, that the cationic amylaceous compounds used in accordance with the invention may be used advantageously not only for the preparation of plaster compositions but also for additive compositions or mixing water intended for such compositions.

EXAMPLE 2

Use of Cationic Amylaceous Compounds According to the Invention and Carboxy or Hydroxyalkyl Amylaceous Compounds in Various Plaster Compositions Within the context of this example, the effectiveness of cationic amylaceous compounds according to the invention is compared with amylaceous compounds of a hydroxyalkyl or carboxyalkyl nature respectively, used according to the prior art in three plaster compositions having, in particular, different pH values.

The cationic amylaceous compounds according to the invention, the thickening nature of which is estimated in at least one of said plaster compositions, consist of the compounds A, C and D described above in EXAMPLE 1.

The hydroxyalkyl type of amylaceous compound, the thickening nature of which is estimated, consists of the hydroxypropyl potato starch marketed by AVEBE under the name "OPAGEL FP6Y" which has, according to the solubility test described above, a solubility in water of about 95%. This amylaceous compound used according to the prior art, will be known hereinafter as compound T4.

The carboxyalkyl type of amylaceous compound, the thickening nature of which is estimated, consists of the carboxymethyl potato starch marketed by AVEBE under the name "OPAGEL TPG" which has, according to the solubility test described above, a solubility in water of about 88%. This amylaceous compound used according to the prior art, will be known hereinafter as compound T5.

The first plaster composition studied within the context of this example is of the same type as that described in EXAMPLE 1 except that 0.1 wt. % of lime is introduced into the plaster, in addition to 0.04% of an amylaceous compound (according to the invention or otherwise) and 0.05% of "RETARDAN® P". As a result, said plaster composition has a pH of about 11.4.

In comparison with the reference composition T0 which does not contain any amylaceous compound but contains "RETARDAN® P"+0.1% of lime, the compositions obtained with, respectively 0.04% of each of compounds A, C and T5 are COMPOSITIONS A, C and T5 which have the "delta SV" values given below:

| COMPOSITION | DELTA SV (in mm) |
|---|---|
| T0 | 0 |
| A | −85 |

-continued

| COMPOSITION | DELTA SV (in mm) |
|---|---|
| C | −100 |
| T5 | −35 |

The second plaster composition studied within the context of this example is identical to the previous one except that 0.03% of an amylaceous compound (according to the invention or otherwise) and 0.05% of lime are introduced in addition to 0.05% of "RETARDAN® P". As a result, said plaster composition has a pH of about 10.6.

In comparison with a reference composition T0 containing only "RETARDAN® P" and lime (0.05%/weight of plaster), the compositions obtained with, respectively 0.03% of each of compounds C, D T4 and T5, are COMPOSITIONS C, D, T4 and T5 which have the "delta SV" values given below:

| COMPOSITION | DELTA SV (in mm) |
|---|---|
| T0 | 0 |
| C | −70 |
| D | −52 |
| T4 | −45 |
| T5 | −57 |

Moreover, other tests carried out with a composition of the same type as that described in EXAMPLE 1, i.e. containing no lime and having a pH of about 10, showed that compound C, a cationic amylaceous compound according to the present invention, was just as effective a thickener as the carboxymethyl compound T5 and significantly more effective than the hydroxypropyl compound T4.

The overall outcome of the results of the present EXAMPLE 2 is that, within the context of the invention, the cationic amylaceous compounds selected by the Applicants:

are just as effective, if not more effective, than non-cationic amylaceous compounds normally used in plaster compositions, including carboxyalkyl amylaceous compounds commonly used in manual plasters, and may be used in conformity with the current requirements of the art in compositions with various pH values including those situated in an "intermediate region" between about 10.5 and 11.

These results confirm, inter alia, the very good effectiveness of cationic amylaceous compounds in conformity with the present invention having a high amylopectin content (=80 wt. %) such as those derived from waxy corn.

EXAMPLE 3

Use of Cationic Amylaceous Compounds, According to the Invention or Otherwise, in Projection Plaster Compositions Within the context of this example, the thickening function of cationic amylaceous compounds, according to the invention or otherwise, are compared in projection plaster compositions.

The projection plaster used within the context of these tests is in the form of a powder composed essentially of calcium sulphate hemihydrate.

To this plaster is added:
a) 0.14 wt. % of a cationic amylaceous compound according to the invention or otherwise,
b) 0.05% of "RETARDAN® P", and
c) 0.6% of lime.

The pH of the plaster composition thus obtained is about 12.7.

A "reference" plaster composition is prepared in the same way except that no amylaceous compound is introduced therein.

By sprinkling, each of the plasters is mixed with a weight of water corresponding to 0.7 times the weight of plaster, with the result that the plaster compositions studied have a water/plaster or "W/P" ratio of 0.7.

The thickening nature of the cationic amylaceous compounds, according to the invention or otherwise, is determined in a conventional manner in conformity with the "Vibrating Table Method" described in chapter 3, page 6-point 3.2.1 of the "CATALOGUE OF TEST METHODS FOR PLASTERS" published in April 1983 in the name of SYNDICAT NATIONAL DES INDUSTRIES DU PLATRE.

After sprinkling plaster into the water (time: 15 seconds), the plaster composition is agitated with a mixer for 20 seconds at a speed of 600 rpm then for 20 seconds at 900 rpm and finally for 20 seconds at 1100 rpm. During the mixing period, horizontal figure of eight movements are given to the mixer at a rate of one per second.

The mix, after being left to stand (for 1 mm) is then poured into a mould consisting of a truncated ring of standardised dimensions (height: 60 mm, internal diameter 1: 100 mm, internal diameter 2: 70 mm), oiled and wiped beforehand. Said mould is filled flush with the edge and then immediately lifted off slowly upwards.

As indicated in the "Vibrating table method" mentioned above, the vibrating table is operated for 15 seconds at a rate of one vibration per second. The diameter of the blank thus formed is then measured in two perpendicular directions.

For each composition tested, the spread value is expressed in mm taking into account the arithmetic mean of the measurements carried out on said composition.

Within the context of these test, studies were carried out in respect of the thickening nature a) of the cationic amylaceous compounds T1 to T3 which do not conform with the invention, such as those described already in EXAMPLE 1, b) amylaceous compounds C to E according to the invention such as those described already in EXAMPLE 1, and c) amylaceous compounds I to O, also according to the invention and the description of which is given below.

Compound I=cationic hydrolysate of wheat starch A, DE<5, (fixed nitrogen content about 0.6%), atomised and having a solubility in water practically equal to 100%.

Compound J=fluidized cationic waxy corn starch (fixed nitrogen content about 0.3%) having a solubility in water of about 85%.

Compound K=cationic starch mixture (75% wheat/25% potato) (fixed nitrogen content of the mixture about 0.6%), extruded and having a solubility in water of about 89%.

Compound L=cationic potato starch (fixed nitrogen about 0.6%) cross-linked and extruded, having a solubility in water of about 95%.

Compound M=cationic waxy corn starch (fixed nitrogen content about 0.7%), extruded and having a solubility in water of about 80%.

Compound N=cationic potato starch (fixed nitrogen content about 1%), extruded and having a solubility in water of about 86%.

Compound O=cationic wheat starch A* (fixed nitrogen content about 1%), extruded and having a solubility in water of about 85%.

The results below give for each of the COMPOSITIONS T1 to T3 (which do not conform with the invention), C to E (according to the invention) and I to O (according to the invention) resulting from the present EXAMPLE 3, the difference "delta SV" between the spread value obtained for said COMPOSITION and that observed for COMPOSITION T0 containing no amylaceous compound.

These results also include the "delta SV" values obtained with, respectively, each of the COMPOSITIONS T1b, T1c, T2b, T2c, T3b and T3c consisting of the projection plaster compositions below:

COMPOSITION T1b=idem COMPOSITION T1 of the present EXAMPLE 3 but with a rate of introduction of cationic amylaceous compound T1 multiplied by about 3 (0.4%).

COMPOSITION T1c=idem COMPOSITION T1b but with a rate of introduction of cationic amylaceous compound T1 multiplied by 10, i.e. 1.4%.

COMPOSITION T2b=idem COMPOSITION T2 of the present EXAMPLE 3 but with a rate of introduction of cationic amylaceous compound T2 multiplied by about 4 (0.58%).

COMPOSITION T2c=idem COMPOSITION T2b but with a rate of introduction of cationic amylaceous compound T2 multiplied by about 7 (1%).

COMPOSITION T3b=idem COMPOSITION T3 of the present EXAMPLE 3 but with a rate of introduction of cationic amylaceous compound T3 multiplied by about 4 (0.58%).

COMPOSITION T3c=idem COMPOSITION T3b but with a rate of introduction of cationic amylaceous compound T3 multiplied by about 7 (1%).

Thus, on the basis of all the above-mentioned plaster compositions in the present EXAMPLE 3, the following "delta SV" values are obtained:

| COMPOSITION | DELTA SV (in mm) |
| --- | --- |
| T0 | 0 |
| T1 | −10 |
| T2 | +35 |
| T3 | +44 |
| C | −50 |
| D | −65 |
| E | −76 |
| I | −54 |
| J | −48 |
| K | −75 |
| L | −90 |
| M | −86 |
| N | −86 |
| O | −97 |
| T1b | −25 |
| T2b | 0 |
| T3b | +10 |
| T1c | −90 |
| T2c | −10 |
| T3c | −10 |

The measurements carried out within the context of this EXAMPLE 3 confirm that the cationic amylaceous compounds specifically selected within the context of the present invention are significantly more effective than those used in conformity with patent FR 2 434 821 and, more generally, that cationic amylaceous compounds which do not simultaneously exhibit the specific properties of solubility in water (according to the test described above) and fixed nitrogen content.

The cationic amylaceous compound T1, whilst having a high solubility in water (about 95%), does not have the required fixed nitrogen content to allow it to be regarded as a very effective thickener for projection plasters. Indeed, in order to obtain an effectiveness comparable with that conferred by the amylaceous compounds according to the present invention, said amylaceous compound T1 must be introduced in very significantly higher quantities into the plaster compositions (quantities multiplied by a factor of 3, at least).

This is true, inter alia, with regard to the cationic amylaceous compounds L and M according to the invention. It is remarkable to emphasise that the rate of introduction of said amylaceous compound T1 would have to be multiplied by a factor of 10 (i.e. 0.14×10=1.4%) for this compound to have a thickening effect comparable with that of products L and M.

The results of the present EXAMPLE 3 also show:

1) the lack of or poor effectiveness of the cationic amylaceous compounds T2 and T3 which, in the present case, bring about an effect either contrary to the desired effect (cf COMPOSITIONS T2, T3 and T3b: spread values greater than those observed with COMPOSITION T0 containing no amylaceous compound) or a zero or quasi zero effect (cf COMPOSITIONS T2b, T2c and T3c)

2) the possibility of using effectively, in accordance with the invention, cationic amylaceous compounds of very diverse kinds, particularly with regard to their botanical origins (corn, waxy corn, potato starch, wheat, wheat/starch mixture, . . . ) and in terms of the chemical and/or physical treatments which said compounds have undergone, simultaneously or non-simultaneously with their cationisation (cross-linking, fluidification or hydrolysis, extrusion, gelatinisation in a drum, atomisation, . . . ).

EXAMPLE 4

Use of Cationic Amylaceous Compounds According to the Invention and Carboxy or Hydroxyalkyl Amylaceous Compounds in Projection Plaster Compositions Within the context of this example, the effectiveness of cationic amylaceous compounds according to the invention is compared with that of, respectively, hydroxyalkyl or carboxyalkyl compounds used according to the prior art, in the projection plaster composition described in EXAMPLE 3, the pH of which is about 12.7.

The "reference" amylaceous compounds consist of the compounds T4 and T5 as described in EXAMPLE 2.

The cationic amylaceous compounds according to the invention, the thickening nature of which is estimated, consist of the compounds F and G as described in EXAMPLE 1, and compounds P and Q as described below.

Compound P=cationic corn starch (fixed nitrogen content about 1.2%), extruded and having a solubility in water of about 88%.

Compound Q=cationic waxy corn starch (fixed nitrogen content about 1%), extruded and having a solubility in water of about 88%.

In comparison with the reference composition T0 containing no amylaceous compound but only "RETARDAN® P" and 0.6% of lime, the corresponding compositions obtained with respectively 0.14% of each of the compounds T4, T5, F, G, P and Q are compositions having the "delta SV" values given below:

| COMPOSITION | DELTA SV (in mm) |
|---|---|
| T0 | 0 |
| T4 | −110 |
| T5 | −20 |
| F | −110 |
| G | −95 |
| P | −105 |
| Q | −113 |

The overall outcome of the results of the present EXAMPLE 4 is that the cationic amylaceous compounds selected according to the invention, including those having a high amylopectin content, are very effective thickeners for projection plasters.

This effectiveness is, in the present case, comparable with that obtained with compound T4, which is a very commonly used thickener in plaster compositions having a high pH but whose disadvantages were recalled above. On the other hand, the effectiveness of the cationic amylaceous compounds which specifically conform with the invention is, in the present case, very significantly greater than that of the carboxymethyl compound T5.

Additional tests also showed that the effectiveness of the cationic amylaceous compounds according to the invention was not significantly affected in any case by the storage of said compounds, for example for 3 days at 80° C., or by the fact of varying the quality of the water (hardness, chlorine level, . . . ) used for mixing the plaster compositions.

The outcome of all the results of EXAMPLES 1 to 4 is that a category of selected amylaceous compounds is now available which, in particular:

a) can be applied industrially to plaster compositions of various kinds, compositions and intended uses, b) can be used in plaster compositions having various pH values, including those situated in an "intermediate" region, c) can be used directly in mixing water with various properties or additive compositions, d) is easy to obtain, flexible and inexpensive, and e) whose effectiveness is not substantially affected during storage.

We claim:

1. A plaster composition containing a cationic amylaceous compound, wherein said cationic amylaceous compound has a fixed nitrogen content of at least about 0.15% and a solubility in water of at least about 50%.

2. A plaster composition according to claim 1, wherein the cationic amylaceous compound has a solubility in water of 70 to 100%.

3. A plaster composition according to claim 1, wherein the cationic amylaceous compound has a fixed nitrogen content of 0.25 to 1.50%.

4. A plaster composition according to claim 1, wherein the cationic amylaceous compound has a fixed nitrogen content of 0.16 to 2%.

5. A plaster composition according to claim 1, wherein the cationic amylaceous compound represents about 0.01% to about 0.5% by weight with respect to the weight of plaster contained in said composition.

6. A plaster composition according to claim 1, wherein the cationic amylaceous compound is chosen from cationic starches, crosslinked cationic starches, oxidised cationic starches and cationic starches fluidized or hydrolysed by acids or enzymes.

7. A plaster composition according to claim 6, wherein the cationic starches hydrolysed by acids or enzymes consist of cationic starch hydrolysates with a DE of less than about 5.

8. A plaster composition according to claim 1, wherein the cationic amylaceous compound is chosen from cationic amylaceous compounds which have been treated by heat, mechanically, at high and very high pressures, with ultrasonics, microwaves or under vacuum.

9. A plaster composition according to claim 8, wherein the cationic amylaceous compound is chosen from cationic amylaceous compounds which have been extruded, continuously steam cooked, gelatinised in a drum, atomised, fluidized, or sheared mechanically or ground.

10. A plaster composition according to claim 1, wherein the cationic amylaceous compound is chosen from those derived from cereals or tubers having an amylopectin content of at least about 80%.

11. A plaster composition according to claim 10, wherein the cationic amylaceous compound is chosen from those derived from waxy corn or waxy potato.

12. A plaster composition according to claim 1, wherein the cationic amylaceous compound has a solubility in water of 75 to 99.8%.

13. A plaster composition according to claim 1, wherein the cationic amylaceous compound has a fixed nitrogen content of 0.20 to 1.85%.

14. A plaster composition according to claim 1, wherein the cationic amylaceous compound represents about 0.01 to about 0.2% by weight with respect to the weight of plaster contained in said composition.

* * * * *